June 26, 1962 L. DYCHE 3,040,863

FEED MECHANISM FOR PRESSES

Filed Dec. 14, 1959 5 Sheets-Sheet 1

Inventor
L. Dyche
By Dennison, Downing & Seebold
Attys.

June 26, 1962 L. DYCHE 3,040,863

FEED MECHANISM FOR PRESSES

Filed Dec. 14, 1959 5 Sheets-Sheet 2

Inventor
L. Dyche
By Mascock Downing & Seebold
Attys.

Inventor
L. Dyche
By Glascock Downing & Seebold
Attys.

June 26, 1962 L. DYCHE 3,040,863

FEED MECHANISM FOR PRESSES

Filed Dec. 14, 1959 5 Sheets-Sheet 4

Inventor
L. Dyche
By Glascock Downing & Seebold
Attys.

Inventor
L. Dyche
By Dawson, Downing & Daubold
Attys.

United States Patent Office 3,040,863

Patented June 26, 1962

1

3,040,863

FEED MECHANISM FOR PRESSES

Leslie Dyche, 38 Coleshill Road, Marston Green, Warwickshire, England

Filed Dec. 14, 1959, Ser. No. 859,226

3 Claims. (Cl. 198—24)

The object of this invention is to provide in a convenient form mechanism for feeding separate workpieces singly to a press.

Mechanism according to the invention comprises in combination a platform adapted to be disposed adjacent the die of the press with its upper surface normally substantially level with the upper surface of the die, a feed member disposed above the platform and having formed in it an aperture or recess adapted to accommodate at least a part of a workpiece resting upon the platform, means operable in synchronism with the press for moving the feed member automatically between a loading position in which the aperture or recess is located above the platform, and a position in which the aperture or recess is situated over the press die, said means being arranged to cause said member to dwell in the latter position, and means for lifting the feed member automatically while in said latter position prior to its movement to the loading position.

Figure 1:
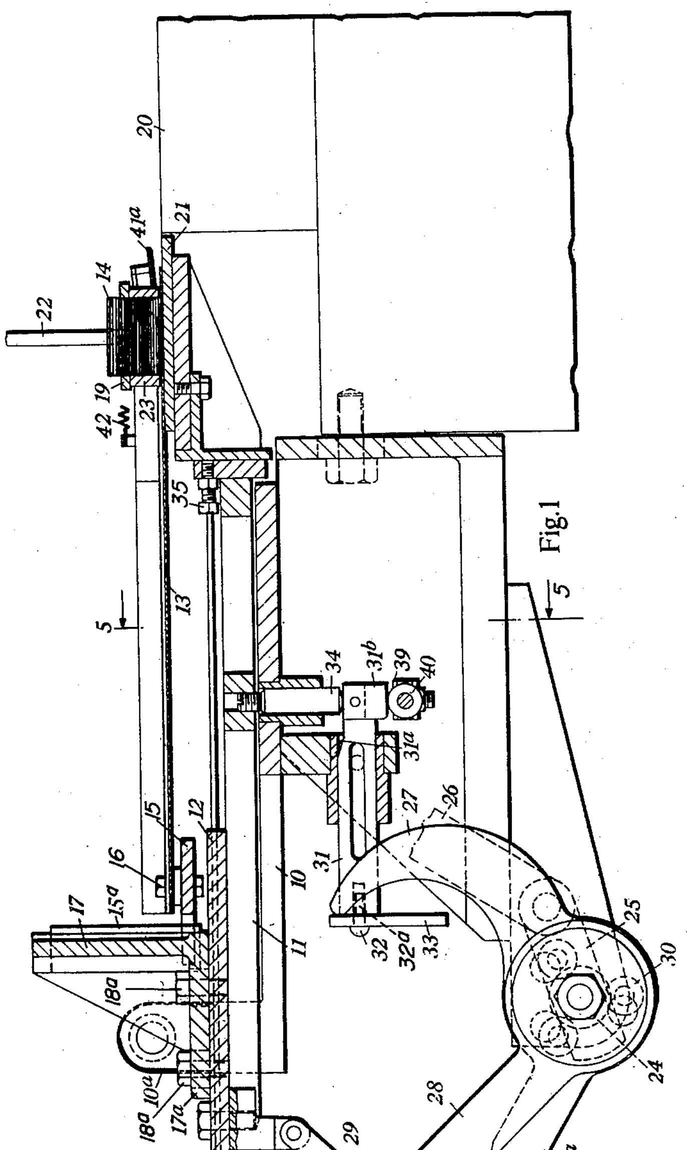
Figure 6:
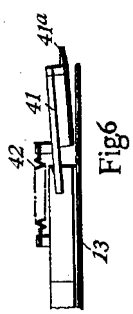
Figure 7:
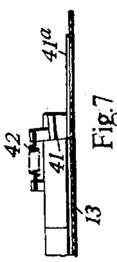
Figure 2:
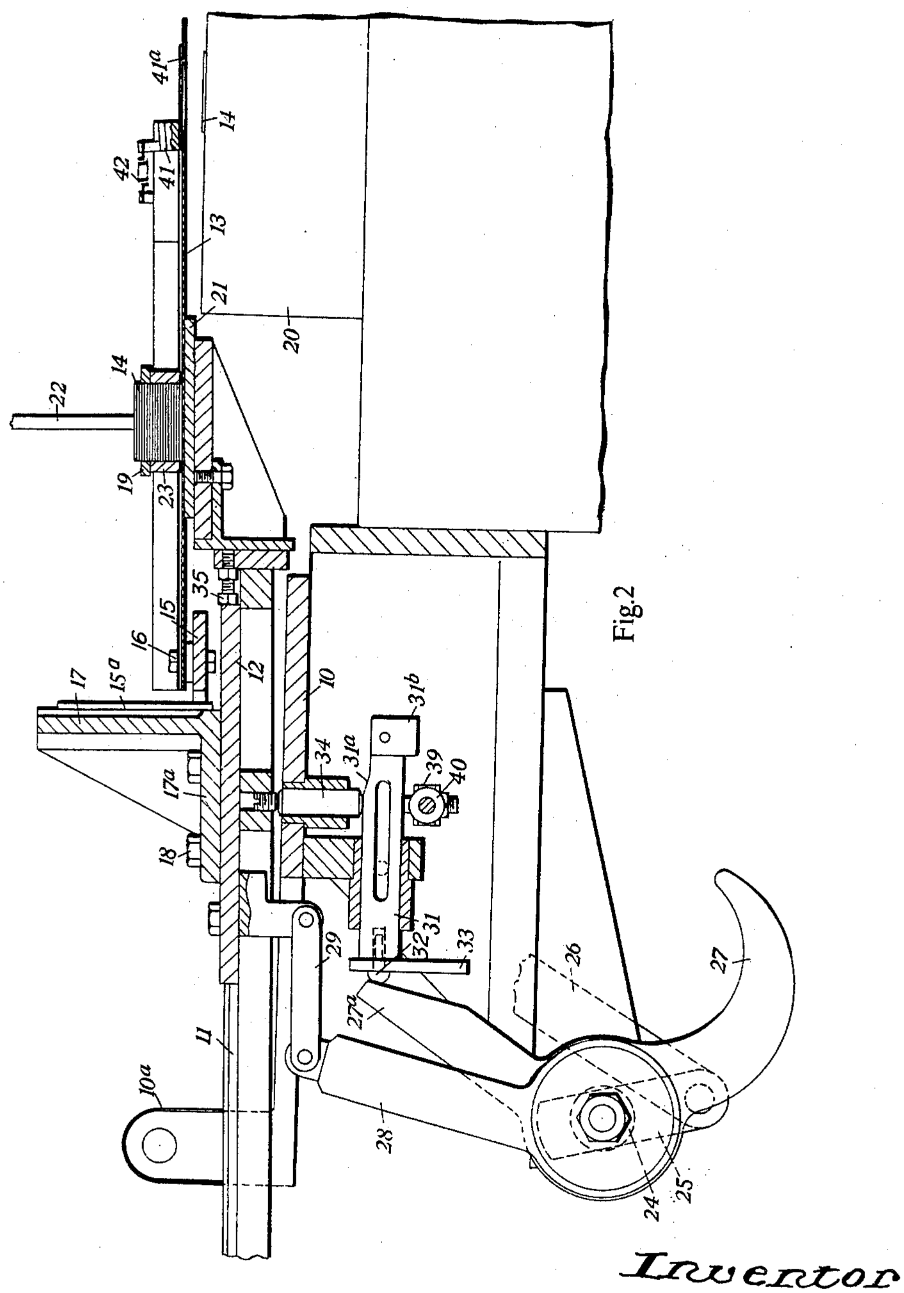
Figure 3:
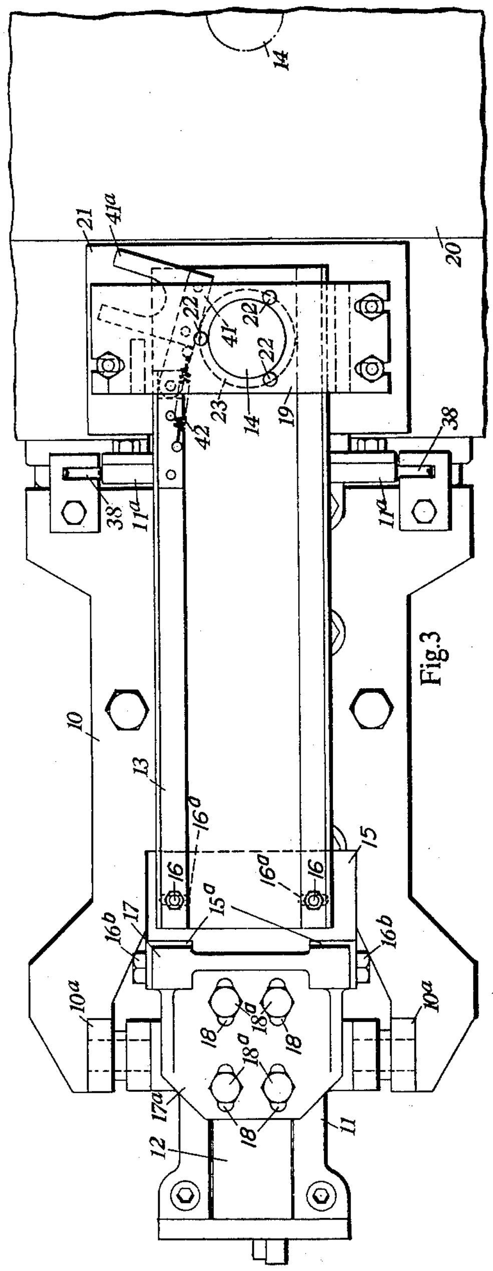
Figure 4:
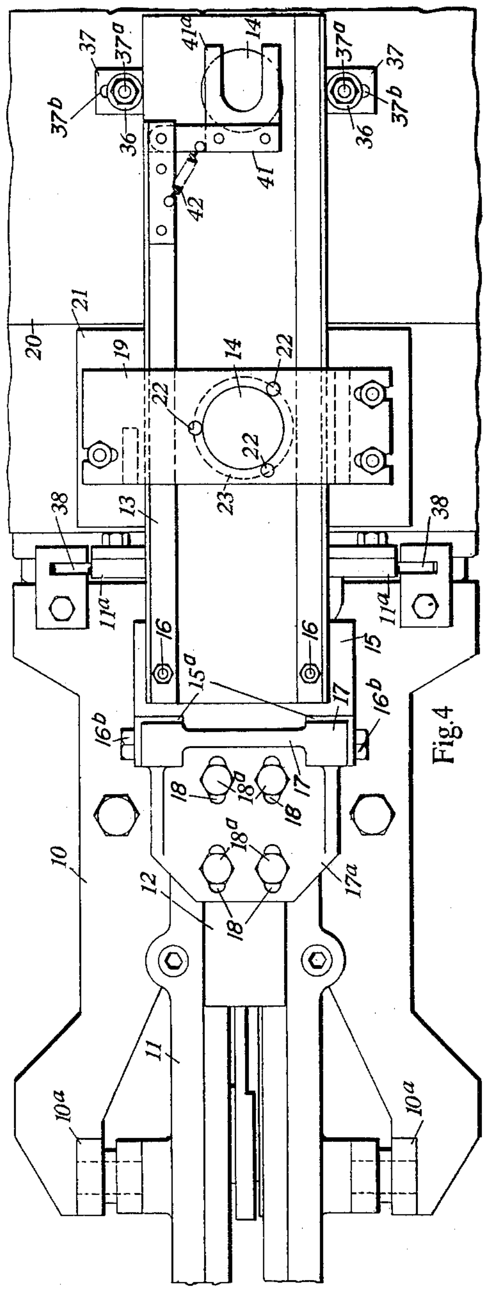
Figure 5:
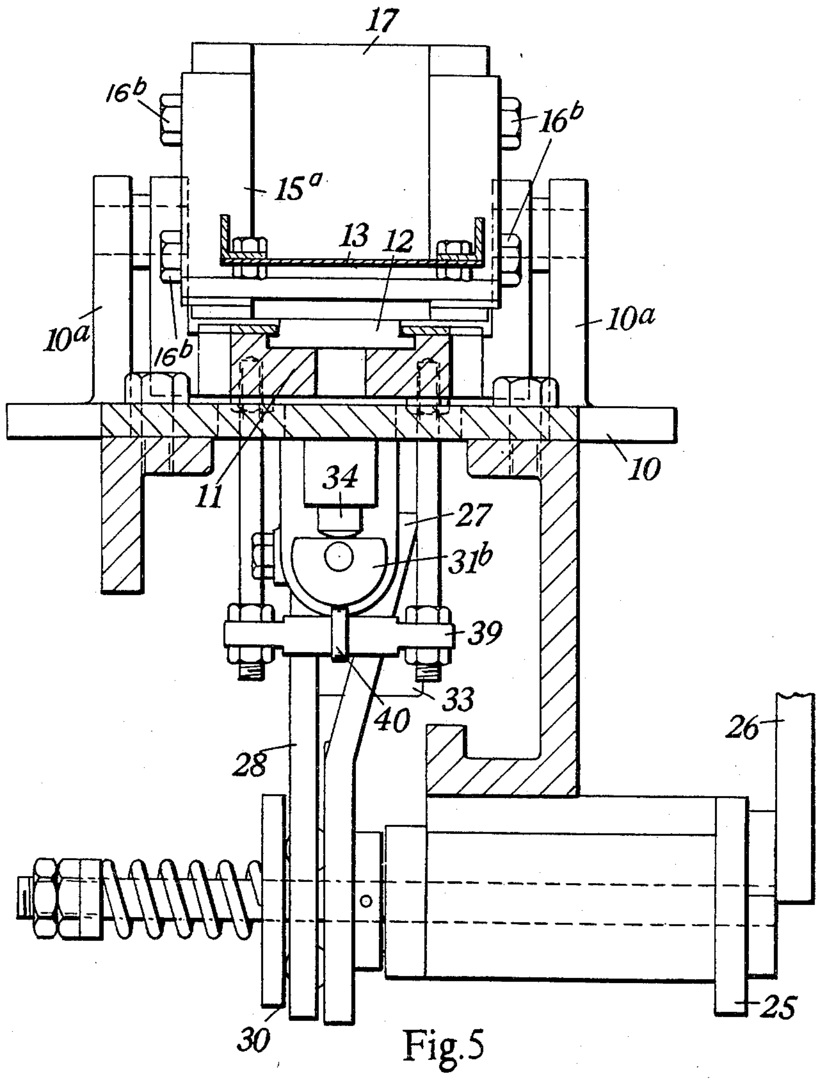

In the accompanying drawings:

FIGURE 1 is a sectional side view of an example of the invention showing the feed member in the loading position, FIGURE 2 is a similar view to FIGURE 1 showing the feed member in the forward position, FIGURE 3 is a plan of FIGURE 1, FIGURE 4 is a plan of FIGURE 2, FIGURE 5 is a section on the line 5—5 of FIGURE 1, but drawn to a larger scale, and FIGURES 6 and 7 respectively are sectional fragmentary side views showing the forward end of the feed member in the loading and forward positions.

In the illustrated example of the invention there is provided a fixed body part 10 having a pair of upstanding and spaced lugs 10$^a$ between which is pivotally mounted a guide 11 which is normally disposed in a horizontal position. Upon the guide 11 is a longitudinally movable slide 12 to which is connected a feed member 13 in the form of a metal plate having formed in it an aperture conforming in shape and size to that of the workpiece 14 to be fed to the press. In order to admit of universal adjustment of the feed member 13 relative to the slide 12, the member 13 is bolted to one flange 15 of an angle bracket by means of bolts 16 which pass through transversely extending slots 16$^a$ (FIGURE 3) in the said flange of the bracket. The other flange 15$^a$ of this bracket has bolt and slot connections with a vertically extending flange 17 of a second angle bracket, the slots (not shown) of these connections extending in a vertical direction, and being engaged by bolts 16$^b$. The other flange 17$^a$ of the second angle bracket has formed in it slots 18 which extend longitudinally of the slide, and through which extend bolts 18$^a$ securing it to the slide 12. As a result the feed member can be adjusted both longitudinally, laterally and vertically relative to the slide.

The slide 12 is adapted to be reciprocated between a loading position (shown in FIGURES 1 and 3) in which the aperture in the feed member 13 is disposed beneath a magazine or other loading device 19 and a position (shown in FIGURES 2 and 4) in which the aperture in the feed member 13 is located over the fixed die 20 of the press. Adjacent the fixed die of the press is a platform 21 which is connected to the guide 11 and is normally disposed with its upper surface horizontal and at

2 the level of the upper surface of the die 20. This platform is located below the feed member 13 in a position to serve as a support for a workpiece 14 in the aperture as the feed member is moved from the loading position to the die. Where the workpieces are flat blanks, the feed member 13 may be flat upon the platform 21 and be of a thickness not more than the thickness of the blank. However, where the workpiece is a cup, or other part of substantial depth, the feed member may be spaced from the platform, by such a distance that a workpiece resting upon the platform will have its upper portion only located in the aperture.

The magazine or other loading device 19 may be of any convenient form but, as shown, comprises a bridge piece designated by the reference 19 having three equispaced upstanding pins 22 for locating a stack of workpieces, and an annular part 23 secured around an aperture in piece 19 at the underside thereof, the part 23 being of a diameter slightly greater than that of the workpieecs. Moreover, the lower edge of the part 23 is spaced from the platform 21 by a distance substantially equal to the depth of the feed member 13, so that the latter can slide thereunder.

Carried by the fixed body part 10 is a shaft 24 extending transversely relative to the slide and carrying a radial arm 25. To the arm 25 is connected a link 26 or other means through which angular movement is imparted to the shaft 24 from the crankshaft or some other movable part (not shown) of the press. On the shaft 24 is secured a bellcrank lever 27, 27$^a$ and angularly movable about the shaft is an actuating arm 28 which at its outer end is connected by a link 29 to the slide 12. The actuating arm 28 is normally moved angularly with the shaft by means of an overload clutch 30.

Mounted for horizontal movement in the body part is a horizontal plunger 31 having at one end an adjustable abutment 32 with which the arm 27$^a$ of the bellcrank lever is adapted to make contact. The adjustable abutment 32 may be formed by the head of a screw 32$^a$ (FIGURE 1) in engagement with a complementary screw-threaded hole formed coaxially in the adjacent end portion of the plunger 31. The upper portion of the periphery of the other end of the plunger 31 is shaped to form a cam surface 31$^a$ against which bears the spherical lower end of a vertically slidable push rod 34 extending through the body part and forming a support for the guide 11. When the slide is in a loading position the push rod 34 bears against the lower portion of the cam surface on the plunger 31 to maintain the guide in a horizontal position.

In operation when angular movement is imparted to the shaft 24 from the press, the actuating arm 28 and the bellcrank lever 27, 27$^a$ will both be moved angularly, and the slide 12 will move the feed member 13 to a position in which its aperture is located over the die as shown in FIGURES 2 and 4. In this position the slide 12 comes into contact with an adjustable stop 35 which will prevent further movement of the feed member in this direction. As a result continued angular movement of the shaft in this direction will cause the clutch 30, to slip, and finally the arm 27$^a$ of the bellcrank lever will contact the adjustable abutment 32 on the plunger 31 and move this plunger axially. The higher portion of the cam surface 31$^a$ on the plunger will thus be moved into contact with the push rod 34 and angular movement will be imparted to the guide 11, the slide 12, the platform 21, and the feed member 13 thereby disengaging the latter from around the workpiece. It will be appreciated that owing to the fact that movement of the feed member 13 is arrested before the arm 27$^a$ of the bellcrank lever contacts the plunger abutment 32, the feed member will dwell at the end of its forward stroke prior to it being lifted from around the workpiece. This dwell is necessary to ensure that movement of the workpiece relative to the die does not take place during the raising of the feed member.

After the feed member 13 has been raised the press moves the shaft 24 angularly in the opposite direction. As soon as the clutch is re-engaged the slide 12 and feed member 13 are retracted towards the loading position, and on reaching this position the arm 27 of the bell-crank lever contacts the abutment plate 33 and moves the plunger 31 in the opposite direction, thereby allowing the guide, the slide, the platform, and the feed member to reassume a horizontal position.

In order accurately to locate the aperture in the feed member relative to the die, rollers 36 may be mounted on brackets 37 on the die block in a position to bear against the edges of the member 13 when it is in a forward position, the brackets 37 being connected to the die block by bolts 37ᵃ which pass through slots 37ᵇ in the brackets to admit of the latter being adjusted laterally relative to the longitudinal axis of the member 13. Moreover, for steadying the guide during its angular movement rollers 38 may be mounted on the body part 10 in a position to bear against the parts 11ᵃ of the guide. Furthermore, a stirrup 39 may be mounted on the guide 11, this stirrup having a roller 40 positioned to engage with the undersurface of the head 31ᵇ on the plunger 31 when the latter is in the position shown in FIGURES 1 and 5, the arrangement being such that the co-action of the head 31ᵇ with the roller 40 will positively return the guide to the horizontal position should it for any reason remain raised when retracted to the feeding position.

Near the aperture in the feed member 13 is an arm 41 which is pivotally mounted about an axis which is inclined at a small angle to the normal relative to the member. The arm is loaded by a spring 42 to the position shown in FIGURES 4 and 7 in which a forked part 41ᵃ thereon will bear against the upper surface of a workpiece in the aperture, and thereby prevent the workpiece from being caused to jump from the aperture during movement towards the press die. The arrangement is such that as the feed member is moved to the loading position, the arm 41 will abut against the bridge piece 19 so as to be moved angularly (against its spring 42) out of the path of movement of a workpiece 14 entering the aperture from the magazine or other loading device, the part 41 automatically moving to a position to bear upon the workpiece as the feed member is again moved forwardly towards the die.

The invention is not limited to the construction above described, and various changes may be made without departing from its scope. For example, instead of providing an aperture in the feed member, the latter may have a semi-circular or other recess formed in its outer end for engagement around a part of the workpiece. Moreover, instead of the feed member being reciprocated, it may be movable angularly between a loading position, and a position in which its aperture is located over the fixed die of the press. Furthermore, the lifting movement may be a truly vertical movement as opposed to the angular lifting movement described. However, in all instances it is essential that the feed member after being moved to a position to locate a workpiece on the press die, should dwell before it is lifted to disengage it from the workpiece.

Having thus described my invention what I claim as new and desire to secure by Letters Patent is:

1. Mechanism for feeding workpieces to a fixed die of a press, comprising in combination a stationary body part, a guide carried by and capable of lifting movement relative to the body part, a slide supported on and movable relative to the guide, a platform attached to the guide, storage means for supporting in superimposed relationship on the platform the workpieces to be fed to the fixed die of the press, a feed member in the form of a metal plate disposed in part adjacent the upper surface of the platform, and provided with an opening for accommodating at least a part of the lowermost workpiece on the platform, means connecting the feed member to the slide so that the feed member is movable by the slide for transferring the workpieces in succession from the platform on to the fixed die of the press, an actuating shaft angularly movable in opposite directions about its axis, means connecting the shaft to the slide so that the latter serves under the action of the shaft to move the feed member between a loading position in which the opening in the feed member receives the lowermost workpiece on the platform, and a delivery position in which the workpiece in the said opening rests on the fixed die of the press, means for causing the feed member to dwell in its delivery position, a horizontally movable member which is slidably supported by the stationary body part at a position beneath the guide in spaced relationship thereto, and which is provided at its upper side with a cam surface, a vertically movable member which forms a support for the guide, and which is slidably supported by the stationary body part at a position between the horizontally movable member and the guide with the lower end of the vertically movable member resting on the upper side of the horizontally movable member, and a double-armed lever which is secured to the shaft, and by which the horizontally movable member is operable by the shaft for enabling the cam surface thereon to impart lifting movement to the feed member through the medium of the vertically movable member, the guide, and the platform when the feed member is in its delivery position, and thereby disengage the feed member from the workpiece occupying the opening in the feed member.

2. Mechanism according to claim 1, in which the guide is pivotally connected to the body part on a horizontal axis.

3. Mechanism according to claim 1, and including spring-loaded means carried by the feed member for bearing on the workpiece occupying the opening in the feed member, and thereby preventing the workpiece from moving upwardly out of the said opening during movement of the feed member towards its delivery position, the spring-loaded means being arranged so that it is movable against its spring loading to an inoperative position clear of the opening in the feed member, by contact with a part of the storage means on the platform during the return of the feed member to its loading position following the delivery of a workpiece on to the fixed die of the press.

References Cited in the file of this patent

UNITED STATES PATENTS 2,525,031 Gilbert ---------------- Oct. 10, 1950